Oct. 29, 1940. J. H. BRINTON Re. 21,608

NIGHT LATCH

Original Filed June 15, 1937

WITNESS

F. J. Hartnau.

INVENTOR

Joseph Hill Brinton.

BY Benjamin Helbert

ATTORNEY

Reissued Oct. 29, 1940 Re. 21,608

UNITED STATES PATENT OFFICE 21,608

NIGHT LATCH

Joseph Hill Brinton, Media, Pa., assignor to The Yale & Towne Manufacturing Company, Stamford, Conn., a corporation of Connecticut Original No. 2,136,539, dated November 15, 1938, Serial No. 148,344, June 15, 1937. Application for reissue August 2, 1939, Serial No. 288,646

17 Claims. (Cl. 292—163)

This invention relates to door locking means, especially of the type known in the trade as a "night latch" designed to automatically lock the door when it is closed and adapted to be used in conjunction with the usual mortise lock or the like having door knobs or handles for actually opening and closing the door and a bolt for releasably holding it closed. The principal function of the night latch is thus to lock the door so as to require the use of a key for opening it at least from one side as distinguished from the function of the mortise lock which merely holds it closed while permitting it to be opened from either side without a key or with a key of a character so easily duplicated as to inhibit the attainment of the desired degree of security with the mortise lock alone.

Thus, a night latch ordinarily comprises a beveled spring-pressed bolt adapted to automatically enter the keeper recess in or on the door jamb as the door is closed and retractable therefrom to open the door by operation of a key on one side or a knurled knob or the like on the other side, and as usually constructed necessitates the bolt being manually held in retracted position by the key or knob after it has been withdrawn from its keeper until the door is opened, since if the key or knob be sooner released the bolt immediately returns to the keeper under the influence of its spring.

Most night latches of this character are provided with catches for holding the bolt in retracted position after it has been withdrawn from the keeper, but these are usually operable from the inner side of the door only and cannot be used to hold the bolt retracted when the door is being unlocked from the opposite or outer side with the key. Furthermore such catches hold the bolt retracted until manually released so that if used to hold the bolt retracted while opening the door, the catch must thereafter be so released before the night latch will again operate to lock the door; in consequence these catches are not generally used, even when available, to facilitate opening a locked door.

Thus, it has been my experience that it is usually extremely difficult if not impossible to open a locked door equipped with a night latch and a mortise lock except by using both hands, one to release the mortise lock and actually open the door, and the other to unlock the night latch with the key and hold its bolt in retracted position while this is being done. This results in considerable inconvenience, especially when one is carrying a package, or for some other reason has but a single hand free. So far as I am aware, no night latch has heretofore been suggested comprising a spring-pressed bolt which can be retracted from its keeper by operation of the key, automatically held in retracted position even while still aligned with the keeper and until the door has been opened, and then automatically predisposed thereafter for locking coaction with the keeper. My lock therefore obviates the necessity of manually holding the night latch bolt retracted from its keeper while it remains aligned with the keeper and while the mortise lock is being manipulated to open the door.

Thus, in night latches constructed according to my invention, when the bolt is retracted from the keeper, as by means of the key, it is automatically held in retracted position until the door is opened and the bolt moved from opposite its keeper. Means are provided whereby the bolt is predisposed thereafter for locking the door when closed, without an intermediate or additional operation. Preferably, the bolt is automatically released for projection by said means when the door is opened and the bolt moved away from opposite its keeper, so that the bolt is prepared to operate in the usual way when the door is subsequently closed. Accordingly, a door to which my night latch is applied may be opened with one hand, first using the night latch key to retract the night latch bolt from its keeper, thereby bringing into play the automatic mechanism for holding it retracted and enabling the key to be removed from the key hole without relocking the door, and then operating the mortise lock in the usual way for opening the door with the same hand as was used for the key. Thus, the retracted latch bolt is prevented from returning to the keeper while the door remains closed, but when the door is opened the bolt is automatically predisposed to interlock with the keeper the next time the door is closed.

A further object is the provision in a night latch of automatic mechanism associated with the latch bolt, including a part adapted to engage the bolt keeper without entering it, which when so engaging the keeper positions other parts of the mechanism for automatically holding the bolt in retracted position when it is withdrawn from the keeper and which when not thus engaging the keeper has substantially no effect whatever upon the operation of other parts of the night latch.

Other purposes, objects and advantages of the invention will hereinafter more fully appear or will be understood from the following description of certain practical embodiments thereof which are at present preferred and are illustrated in the accompanying drawing, in which Fig. 1 is a side elevation partly in section of one night latch constructed in accordance with the invention, a keeper adapted for association therewith being diagrammatically indicated in dot and dash lines.

In the several figures like characters are used to designate the same parts.

Figure 1:
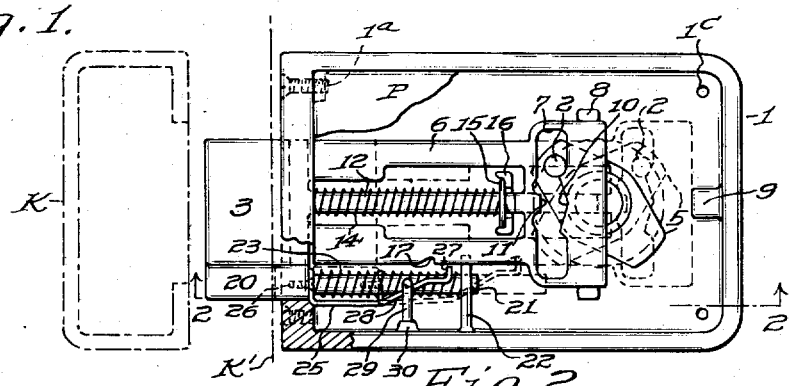
Figure 2:
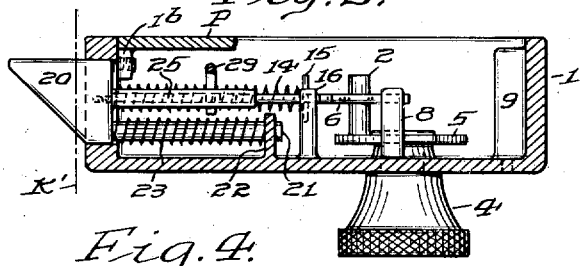
Fig. 2 is a section on the line 2—2 in Fig. 1.
Figure 3:
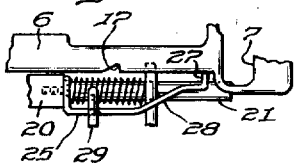
Fig. 3 is a fragmentary side elevation of the night latch shown in Fig. 1 with the parts in the positions they assume when the door is locked and the latch bolt therefore entered in its keeper.

Referring now more particularly to the drawing, the night latch shown in Figs. 1, 2 and 3 comprises a housing 1 adapted to be secured to the door, with its open face toward the latter, by screws 1a in the end of the housing threaded into lugs 1b on a plate P attached to the door and additional screws (not shown) extending into the door through holes 1c and corresponding holes in the plate. The plate also helps to retain in the door a key cylinder connected with the usual latch actuating mechanism projecting from the plate into the housing; as both this mechanism and the key cylinder may be of any usual form adapted for their intended purposes and form no part of the invention, no illustration of them has been included in the drawing. It will be understood, however, that the latch actuating mechanism connected with the key cylinder includes a movable finger adapted to engage a pin 2 which operates to withdraw the latch bolt 3 from its keeper K when suitably actuated, the pin 2 being supported on a plate 5 for rotative movement about the axis of a knurled knob 4 projecting outwardly of the housing on the opposite side of the latch from the door and key cylinder; the pin may therefore be manually moved about this axis from the full to the dotted line position in Fig. 1 by the knob, key or whatever other device is provided for operating the lock.

The latch bolt 3 is slidable in the end of the housing and projectable therefrom a material distance beyond the line K', which represents the normal position of the inner edge of the keeper K relatively to the housing when the door is closed. The bolt is carried by a plate 6 having a slot 7 in its enlarged rear end into which the pin 2 projects, the plate being longitudinally slidable between guides 8 cast integrally with or fastened to the housing, its rearward travel being limited by a stop 9. As shown in Fig. 1, the slot 7 has formed adjacent its center a recess 10 and an abutment 11 is arranged opposite this recess so as to "burglar proof" the latch bolt 3 when the pin 2 is moved thereinto, the abutment 11 engaging the pin when an effort is made to slide the bolt out of its keeper with the aid of an instrument inserted between the latter and the edge of the door.

Between the latch bolt 3 and the slot 7 the plate 6 is cut out above and below its center line so as to form a longitudinally extending tongue 12 which is surrounded by a coil spring 14 having its rear end abutting a washer 15 bearing against upstanding bosses 16 in the interior of and preferably integral with the housing. The opposite end of this spring bears against the latch bolt, and as it is under compression at all times between the bolt and washer 15, it continuously urges the bolt outwardly of the housing. One side face of the latch bolt is beveled in the usual way to enable it to be forced into the housing by the keeper against the bias of the spring 14 as the door is closed and the spring then projects the bolt into the keeper recess when the rear edge of the former passes beyond the front edge of the latter. Naturally the latch bolt will be retracted by the strike only to the line K', whereas when the latch bolt is retracted by the pin 2, it is moved entirely within the casing 1.

A notch 17 is formed in one edge of the plate 6, and this is the sole material structural difference in the parts thus far described from the corresponding parts of night latches heretofore commonly in use; it will therefore be understood that the said parts are but illustrative of those comprised in one night latch embodying the invention and that their specific form and arrangement are but matters of choice. The notch 17, however, is of considerable importance as its cooperation with mechanism now to be described, by engagement of a part in this notch, enables the advantages of the invention to be realized.

Thus, in accordance with the latter, an auxiliary bolt 20 having one face beveled in conformity with the bevel of the latch bolt 3 is arranged adjacent the latter to slide into and out of the housing, preferably in the same opening as the latch bolt, and controls the operation of the part cooperating with the notched plate. The auxiliary bolt, however, is of such character that although it is depressed, i. e. moved inwardly of the housing, similarly to the latch bolt 3 by the keeper plate as the door is being closed, it engages the plate adjacent the edge of the keeper recess and does not enter the latter when the latch bolt 3, after being aligned therewith is projected thereinto by the spring 14. Consequently when the door is closed the auxiliary bolt 20, through engagement with the keeper plate face, is held substantially within the housing and can project therefrom only as far as the line K', whereas the latch bolt extends beyond this line and into the keeper to lock the door.

A stud 21 projecting inwardly from the rear of the auxiliary bolt 20 is slidable in a guide 22 integral with the housing, and is surrounded by a coil spring 23 interposed between the guide and the auxiliary bolt and constantly urging the latter outwardly of the housing, and a spring trigger 25 is fastened by a screw 26 to the inner face of the auxiliary bolt adjacent the stud 21 and projects sufficiently below the lower face of the auxiliary bolt to engage the adjacent corner of the housing at the edge of the recess through which the auxiliary bolt slides, and thereby limits outward movement of the latter under the influence of the spring 23. The trigger extends rearwardly from the auxiliary bolt and terminates at its rear end in a toe 27 and has an intermediate inclined portion 28 so positioned that an L-shaped detent 29 inserted in a boss 30 on the adjacent wall of the housing engages this portion to draw the toe 27 away from the plate 6 as the auxiliary bolt and trigger move outwardly relatively to the detent, the trigger, of course, being released for engagement with the plate under the influence of its inherent spring tension when the auxiliary bolt and trigger move in the opposite direction. Consequently when, as shown in Fig. 3, the auxiliary bolt is depressed, as by engagement with the keeper plate, but the latch bolt 3 is not depressed, as when it is entered in the keeper recess to lock the door, the toe 27 engages the edge of the plate 6 rearwardly of the notch 17 and is free of engagement with the detent 29. Then when the latch bolt 3 is drawn rearwardly into the housing in unlocking the door and moves to the dotted line position in Fig. 1, the edge of the plate 6 adjacent the toe 27 slides rearwardly in engagement with the latter until the notch 17 registers with it, at which point the toe moves into the notch and thereafter prevents movement of the plate 6 and latch bolt 3 in the opposite direction upon release of the key or knob, as the case may be, until the toe is withdrawn from the notch.

After the latch bolt is retracted as just described, the auxiliary bolt 20 is held depressed by the keeper plate until an opening movement of the door is initiated during which the beveled face of the auxiliary bolt, under the urge of its spring 23, rides on the plate and moves outwardly until the auxiliary bolt clears the plate entirely and returns to fully projected position, as shown in Figs. 1 and 2. During this movement of the auxiliary bolt, the trigger and hence toe 27 move with it thereby enabling latch bolt 3 and plate 6 to move correspondingly under the influence of their spring 14 until the inclined portion 28 of the trigger engages the detent 29 when further movement of the auxiliary bolt causes toe 27 to be withdrawn from notch 17. The latch bolt is then free to move independently of the trigger to its outer limit position as determined by the pin 2 which is prevented by the configuration of the slot 17 from moving counterclockwise beyond the full line position in Fig. 1 except when manually set for "burglar proofing" the latch by moving the pin into the recess 10.

As will be evident from the foregoing, the latch bolt 3 can be operated in the normal manner by the usual mechanism for actuating the pin 2 and except when the door is closed, the auxiliary bolt 20 and trigger 25 do not modify its operation in any way, since the trigger is so positioned as to be unengageable in the notch 17 when the auxiliary bolt is projected from the housing to its outer limit position. However, when the auxiliary bolt is depressed into the housing, as by engagement with the keeper plate when the door is closed, retraction of the latch bolt 3 permits the toe 27 to enter notch 17, and the latch bolt is thereafter automatically held in retracted position until the auxiliary bolt is released. Consequently a door equipped with this night latch may be unlocked in the normal manner, but it is unnecessary for the unlocking mechanism to be held in latch bolt retracting position until the door can be opened far enough to move the bolt out of alignment with the keeper recess since once the latch bolt is retracted sufficiently to clear the keeper, it is automatically held in that position until the auxiliary bolt is moved out of engagement with the keeper plate upon the opening of the door. It is moreover unnecessary to do anything to the night latch to recondition it for locking the door after the latter is opened, as the latch bolt is immediately placed in condition to relock it automatically as soon as the auxiliary bolt 20 is released.

Figure 4:
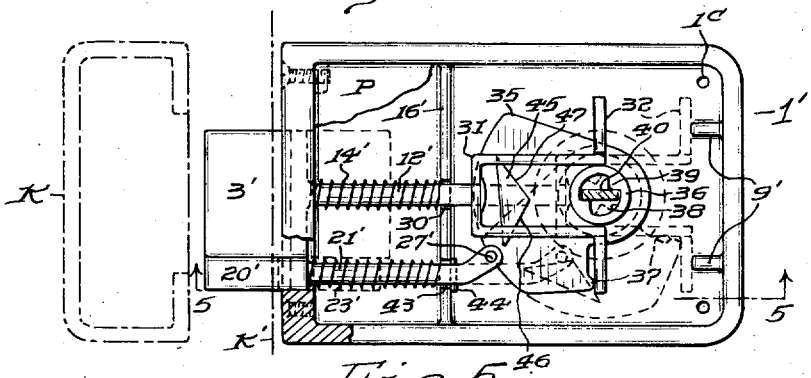
Fig. 4 is a view corresponding to Fig. 1 showing another embodiment of the invention.
Figure 5:
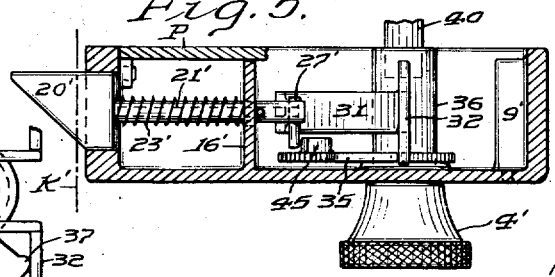
Fig. 5 is a section thereof on the line 5—5 in Fig. 4.
Figure 6:
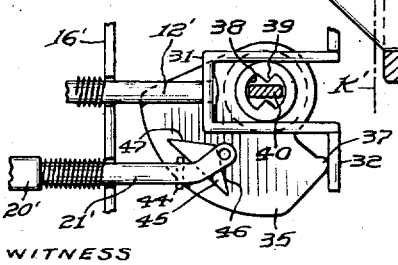
Fig. 6 is a fragmentary side elevation of the night latch shown in the two preceding figures with the parts in the positions they assume during withdrawal of the latch bolt from its keeper.

A similar result is attained in the embodiment of the invention shown in Figs. 4–6 inclusive, but somewhat different mechanism is here employed and may in some instances be preferred over that shown in the preceding figures, one feature of this night latch being that the latch bolt 3' and auxiliary bolt 20' are reversible to permit their bevels to be presented in either direction so that the latch may be used for either an in-opening or an out-opening door, although of course by slight modification the latch shown in Figs. 1–3 may also be constructed to embody this feature.

Thus, referring now to Figs. 4–6, it will be noted the latch bolt 3' has a stud 12' projecting rearwardly from it within the housing 1'; that the rear end of the latch bolt spring 14' engages a transverse guide plate 16' integral with the housing and that the stud extends through the spring and beyond the plate through a slot 30. The rear end of the stud is suitably secured to the center of a generally U-shaped yoke 31 having laterally projecting lugs 32 at the ends of its arms, one of which is engaged by the latch bolt retracting means comprising a plate 35 rotatable in the housing on a bushing 36 connected at one end with the knob 4' and having a toe 37 contacting the adjacent lug 32. The opposite end of the central bore 38 of the bushing is provided with oppositely disposed segmental stops 39 which form abutments for a flat bar 40 which extends into the bushing from the key cylinder (not shown) so that the plate 35 and bushing 36 can be turned counterclockwise about their common axis to retract the latch bolt either directly by the knob 4' or by a key in the cylinder, suitably positioned stops 9' limiting the rearward travel of the lugs 32 during retraction of the latch bolt.

The mechanism by which the latch bolt 3' is held retracted when the door is unlocked includes an auxiliary bolt 20' similar to the auxiliary bolt 20 and having a stud 21' projecting from its back face and supporting a spring 23' which engages the guide plate 16' at its rear end to urge the auxiliary bolt outwardly. To the rear of the guide plate 16', through which the stud 21' slides in a slot 43, is a stop pin 44 in the stud to limit its outward movement by engagement with the plate, and the extremity of the stud is turned inwardly at a small angle toward the yoke 31 and fitted with a transverse pin 27' which projects outwardly towards the plate 35 to cooperate with a cam 45 on the plate in a manner now to be described.

The cam 45 is of generally triangular shape and two of its faces 46, 47, forming an obtuse angle diverging outwardly away from a radius intersecting the axis of the bushing 36, are respectively adapted to engage the pin 27' at different times during the cycle of operation of the night latch. Thus, when the pin 27' is in the position corresponding to a locked door, that is, in the position shown in Fig. 6, rotation of the plate 35 counterclockwise about the axis of the bushing 36 to retract the latch bolt 3' from the keeper brings the face 46 of the cam into engagement with the pin 27' and draws the auxiliary bolt 20' a little further inwardly out of engagement with the keeper plate until the corner of the cam between the faces 46 and 47 passes the pin 27', this point preferably being reached just prior to full retraction of the latch bolt 3' into the housing, when the pin is released by the cam and then moves outwardly a short distance to its former position with the auxiliary bolt 20' again engaging the keeper face. Thus, when the latch bolt 3' is fully retracted, the pin 27 overlies the face 47 of the cam as indicated in dotted lines in Fig. 4, and prevents return movement of the plate in a clockwise direction, so that the latch bolt 3' is positively held retracted from the keeper and cannot move back into it, even after the key or knob used for manually retracting it is released. However, when the pin 27' is moved out of the path of the cam, which occurs when the door is opened and the auxiliary bolt 20' thus freed of engagement with the keeper plate so it can draw the pin 27' over the face 47 of the cam, the release of the latter permits the plate 35 to move clockwise and allow latch bolt 3' under the influence of its spring 14' to return to its normal position as shown in full lines in Fig. 4.

As will be apparent from the drawing, when the auxiliary bolt 20' is in released, i. e. outwardly projected position, pin 27' is out of the path of the cam 45 and the latch bolt may then be retracted and released in the usual way, without being influenced in its action by the presence of the pin 27', but if the auxiliary bolt 20' is depressed as by engagement with the keeper plate, the latch bolt 3' when retracted is held in retracted position until the auxiliary bolt is released.

The flat bar 40 to which reference has been made is of a usual character, but as it is ordinarily fitted in a fairly snug transverse slot in the part receiving it, some further description of the stops 39 affording a positive connection with it for actuation of the lock by a key may be in order. Thus, considerable lost motion is afforded in one direction by the arrangement and spacing of the stops 39 and this permits the latch to be unlocked by a key and the bar 40 to be then returned to normal position for withdrawal of the key from its cylinder while the latch bolt and other parts are held in their unlocked positions by the mechanism above described; moreover this lost motion connection enables the latch to be operated by the knob 4' without turning the bar 40, which is rotatively fixed to the key cylinder so that it ordinarily cannot be turned in the absence of the key. This construction therefore enables the bushing to be turned from either side of the door to actuate the latch without requiring the expensive and complicated mechanism usually necessary to permit independent operation of the key cylinder and knob in other night latches of the same general character.

Reference has been made to the reversibility of this night latch which may be realized when the housing is removed from the door so that the latch bolt 3', auxiliary bolt 20' and the parts fixed to them may be taken out and reversed, that is turned upside down as viewed in Fig. 5, to face their bevels in the opposite direction from that indicated in said figure, whereby the night latch, shown as arranged for use on an out-opening door, may be used on an in-opening door. To enable this reversal to be made it is necessary, when the pin 27' is offset from the axis of the stud 21', as shown in the drawing, to give the stud half a turn relatively to the auxiliary bolt to insure proper positioning of the pin. Consequently, it is desirable that the stud be threaded fairly tightly into the auxiliary bolt with threads of small pitch or that some similar connection between these parts be provided to permit this relative turning of the stud and auxiliary bolt without materially changing the spacing of the auxiliary bolt and pin 27'.

While I have herein shown and described certain illustrative embodiments of the invention which are well adapted for attaining the purposes and objects thereof, it will be understood that the latter may also be realized by other constructions which, with changes and modifications in the form, structure and arrangement of the elements and instrumentalities of the night latches to which I have referred, will readily occur to those skilled in the art.

Having thus described my invention, I claim and desire to protect by Letters Patent of the United States:

1. A night latch for a hinged closure comprising a spring-pressed latch bolt carried by the closure adapted to automatically enter a keeper aperture when aligned therewith, a keeper-engaging auxiliary bolt yieldingly projecting from the closure and slidable relatively thereto when engaged by the keeper and means controlled by said auxiliary bolt when so engaged adapted to hold the latch bolt retracted from the keeper when withdrawn therefrom and operative to release the latch bolt when the auxiliary bolt is moved out of engagement with the keeper.

2. In a night latch comprising a spring-pressed latch bolt adapted to enter an apertured keeper and means for manually withdrawing the bolt from the keeper, an auxiliary bolt adapted to engage the keeper, means interconnecting the auxiliary bolt and latch bolt when the auxiliary bolt is in engagement with the keeper operable to hold the latch bolt retracted from the keeper when manually withdrawn therefrom and means for automatically severing connection between the auxiliary bolt and latch bolt when the auxiliary bolt is disengaged from the keeper.

3. A night latch comprising a spring-pressed latch bolt adapted to enter an apertured keeper, means for retracting the bolt from the keeper and holding means including an auxiliary bolt adapted for engagement with the keeper operative upon retraction of the latch bolt by said retracting means when the auxiliary bolt is engaged by the keeper to releasably hold the latch bolt retracted.

4. A night latch comprising a spring-pressed latch bolt adapted to enter an apertured keeper, means for retracting the bolt from the keeper and holding means including an auxiliary bolt adapted for engagement with the keeper operative upon retraction of the latch bolt by said retracting means when the auxiliary bolt is engaged by the keeper to releasably hold the latch bolt retracted, and means for actuating said holding means to release the latch bolt upon disengagement of the auxiliary bolt from the keeper.

5. A night latch comprising a spring-pressed latch bolt adapted to enter an apertured keeper, actuating means for the bolt including a part projecting rearwardly therefrom and a rotatable part engaging the first part to move it longitudinally in correspondence with the rotative movement of the rotatable part, an auxiliary bolt engageable with the keeper and means carried by the auxiliary bolt operable when the auxiliary bolt is so engaged to releasably hold one of said parts in predetermined position upon its being moved thereto.

6. A night latch comprising a spring-pressed latch bolt adapted to enter an apertured keeper, actuating means for the bolt including a part projecting rearwardly therefrom and a rotatable part engaging the said part to move it longitudinally in correspondence with the rotative movement of the rotatable part, an auxiliary bolt engageable with the keeper, and means carried by the auxiliary bolt adapted to engage the first part upon attainment thereby of a predetermined position when the auxiliary bolt is engaged with the keeper to thereby releasably hold said part in said position.

7. A night latch comprising a spring-pressed latch bolt adapted to enter an apertured keeper, actuating means for the bolt including a part projecting rearwardly therefrom and a rotatable part engaging said part to move it longitudinally in correspondence with the movement of the rotatable part, an auxiliary bolt engageable with the keeper, and means carried by the auxiliary bolt adapted to engage the rotatable part upon attainment thereby of a predetermined position when the auxiliary bolt is engaged with the keeper to thereby releasably hold said part in said position.

8. A night latch comprising a spring-pressed latch bolt adapted to enter an apertured keeper, actuating means for the bolt including a part projecting rearwardly therefrom and a rotatable part engaging the said part to move it longitudinally in correspondence with the rotative movement of the rotatable part, an auxiliary bolt engageable with the keeper, means carried by the auxiliary bolt adapted to engage the first part upon attainment thereby of a predetermined position when the auxiliary bolt is engaged with the keeper to thereby releasably hold said part in said position, and means cooperable with said last mentioned means operative to disengage said means from said part on disengagement of the auxiliary bolt from the keeper.

9. A night latch comprising a spring-pressed latch bolt adapted to enter an apertured keeper, actuating means for the bolt including a part projecting rearwardly therefrom and a rotatable part engaging said part to move it longitudinally in correspondence with the movement of the rotatable part, an auxiliary bolt engageable with the keeper, means carried by the auxiliary bolt adapted to engage the rotatable part upon attainment thereby of a predetermined position when the auxiliary bolt is engaged with the keeper to thereby releasably hold said part in said position, and means cooperable with said last mentioned means operative to disengage said means from said part on disengagement of the auxiliary bolt from the keeper.

10. A night latch comprising a spring-pressed latch bolt, a slotted plate extending rearwardly from the bolt and having a notch in its edge, means for retracting the bolt and plate, a spring-pressed auxiliary bolt slidable relatively to the latch bolt and plate, a trigger carried by the auxiliary bolt adapted when the auxiliary bolt is in one position to enter the notch when the plate is retracted to align the notch therewith and means for automatically disengaging the trigger from the notch during subsequent movement of the auxiliary bolt to another position.

11. A night latch comprising a spring-pressed latch bolt, a notched plate extending rearwardly therefrom and having a transverse slot, means engageable in the slot for retracting the bolt, a spring-pressed auxiliary bolt disposed adjacent the latch bolt, a trigger carried by the auxiliary bolt operable when the auxiliary bolt and latch bolt are retracted to enter the notch in the plate and hold the latch bolt retracted relatively to the auxiliary bolt, and means operative upon movement of the auxiliary bolt from retracted position to disengage the trigger from the notch and thereby release the latch bolt.

12. A night latch comprising a spring-pressed latch bolt, a generally U-shaped yoke extending rearwardly therefrom and interconnected therewith having outwardly projecting lugs at the extremities of its arms, a rotatable plate having a toe adapted on rotation of the plate in one direction to engage one of said lugs to retract the bolt, a cam carried by the plate having a substantially plane edge surface, a spring-pressed auxiliary bolt disposed adjacent the latch bolt, a pin disposed rearwardly of the auxiliary bolt and interconnected therewith projectable into the path of movement of the cam on rotation of the plate and releasably engageable with said plane edge surface to hold the plate rotatively fixed when moved to latch bolt retracting position.

13. A night latch comprising a spring-pressed latch bolt, a generally U-shaped yoke extending rearwardly therefrom and interconnected therewith having outwardly projecting lugs at the extremities of its arms, a rotatable plate having a toe adapted upon rotation of the plate in one direction to engage one of said lugs to retract the bolt, a cam carried by the plate having angularly disposed substantially plane edge surfaces, a spring-pressed auxiliary bolt normally disposed in substantial alignment with the latch bolt and movable relatively thereto and a pin interconnected with the auxiliary bolt and movable thereby into the path of the cam upon rotation of the plate in one direction to successively engage said cam surfaces to releasably hold the latch bolt in retracted position when moved thereto by rotation of the plate in said direction.

14. A night latch comprising a spring-passed latch bolt, a generally U-shaped yoke extending rearwardly therefrom and interconnected therewith having outwardly projecting lugs at the extremities of its arms, a rotatable plate having a toe adapted upon rotation of the plate in one direction to engage one of said lugs to retract the bolt, a cam carried by the plate having angularly disposed substantially plane edge surfaces, a spring-pressed auxiliary bolt normally disposed in substantial alignment with the latch bolt and movable relatively thereto, a pin interconnected with the auxiliary bolt and movable thereby into the path of the cam upon rotation of the plate in one direction to successively engage said cam surfaces to releasably hold the latch bolt in retracted position when moved thereto by rotation of the plate in said direction, and means for automatically moving the pin out of engagement with the cam to thereby release the plate and latch bolt for movement in the opposite direction.

15. A night latch for a hinged closure comprising a spring-pressed latch bolt carried by the closure adapted to interlock with a keeper aperture when aligned therewith, a keeper engaging auxiliary bolt yieldingly projected relatively to the hinged closure, manual means for retracting the spring pressed latch bolt to allow opening movement of said hinged closure, means operative upon retraction of said spring pressed latch bolt, and while said latch bolt is in alignment with said keeper, for maintaining said latch bolt retracted thereafter whereby to allow opening movement of the hinged closure without the necessity of holding said manual means until the latch bolt has moved out of alignment with said keeper aperture, and means whereby said auxiliary bolt releases said spring-pressed latch bolt from said first means for movement into projected position, as said auxiliary bolt moves relatively to said keeper incidental to opening movement of the hinged closure.

16. A night latch for a hinged closure comprising a spring-pressed latch bolt carried by the closure adapted to interlock with a keeper aperture when aligned therewith, a keeper engaging auxiliary bolt yieldingly projected relatively to the hinged closure and particularly engaging said keeper, manual means for retracting the spring pressed latch bolt to allow opening movement of said hinged closure, means operative upon retraction of said spring-pressed latch bolt, and while said latch bolt is in alignment with said keeper, for maintaining said latch retracted thereafter whereby to allow opening movement of the hinged closure without the necessity of holding said manual means until the latch bolt has moved out of alignment with said keeper aperture, and means whereby said auxiliary bolt releases said spring pressed latch bolt from said first means for movement into projected position as said auxiliary bolt moves away from said particular engagement with said keeper incidental to opening movement of the hinged closure.

17. In a night latch for a hinged closure comprising a spring-pressed latch bolt adapted to enter an apertured keeper and manually operated means for withdrawing the bolt from the keeper, an auxiliary bolt for engaging said keeper and movable relatively to said keeper independently of said latch bolt, detent means functionally interposed between said auxiliary bolt and latch bolt and operating when the auxiliary bolt is in particular engagement with the keeper to hold the latch bolt retracted from the keeper once the latch bolt is withdrawn therefrom by said manually operated means, whereby to allow opening movement of the hinged closure without the necessity of holding said manually operated means until the latch bolt has moved with said hinged closure out of alignment with said keeper aperture, and means whereby said auxiliary bolt releases said spring-pressed latch bolt from said detent means for movement into projected position as said auxiliary bolt moves from said particular engagement with said keeper incidental to opening movement of the hinged closure.

JOSEPH HILL BRINTON.